United States Patent
Pierse

(10) Patent No.: US 10,338,612 B2
(45) Date of Patent: Jul. 2, 2019

(54) MACHINE TOOLS AND METHODS OF OPERATION THEREOF

(71) Applicant: Fives Landis Limited, Yorkshire (GB)

(72) Inventor: Michael Pierse, Bedfordshire (GB)

(73) Assignee: Fives Landis Limited, Yorkshire (GB)

( * ) Notice: Subject to any disclaimer, the term of this patent is extended or adjusted under 35 U.S.C. 154(b) by 0 days.

(21) Appl. No.: 15/549,229

(22) PCT Filed: Feb. 22, 2016

(86) PCT No.: PCT/GB2016/050433
§ 371 (c)(1),
(2) Date: Aug. 7, 2017

(87) PCT Pub. No.: WO2016/135459
PCT Pub. Date: Sep. 1, 2016

(65) Prior Publication Data
US 2018/0039293 A1    Feb. 8, 2018

(30) Foreign Application Priority Data

Feb. 24, 2015 (GB) .................... 1503019

(51) Int. Cl.
G05D 23/19 (2006.01)
B23Q 11/14 (2006.01)
B23Q 11/00 (2006.01)
G05D 23/13 (2006.01)

(52) U.S. Cl.
CPC ..... *G05D 23/1919* (2013.01); *B23Q 11/0003* (2013.01); *B23Q 11/141* (2013.01);
(Continued)

(58) Field of Classification Search
CPC ........... G05D 23/1919; G05D 23/1393; G05D 23/1931; B23Q 11/0003; B23Q 11/141; B23Q 11/143
See application file for complete search history.

(56) References Cited

U.S. PATENT DOCUMENTS 1,873,769 A    8/1932   Lang
4,324,965 A *  4/1982   Naumann .............. H05B 6/705
                                                    219/694
(Continued)

FOREIGN PATENT DOCUMENTS

JP    2009097750 A    5/2009
WO    2006065974 A1   6/2006
(Continued)

OTHER PUBLICATIONS

United Kingdom Intellectual Property Office, Patents Act 1977: Search Report under Section 17, Application No. GB1503019.0 dated Jun. 23, 2015 (1 page).
(Continued)

*Primary Examiner* — Jonathan Bradford
(74) *Attorney, Agent, or Firm* — Wood Herron & Evans LLP

(57) ABSTRACT

A fluid temperature control assembly in combination with a machine tool, and a method of adjusting the temperature of a fluid being supplied to a machine tool. The assembly is arranged to adjust the temperature of a fluid being supplied to the machine tool to maintain the fluid at a setpoint temperature at a location downstream of the assembly. The assembly comprises a radio frequency (RF) or microwave energy source to supply energy to the fluid as it passes through the assembly to heat the fluid, a temperature sensing arrangement for outputting a temperature signal responsive to the temperature of the fluid at the downstream location, and a control arrangement configured to receive the temperature signal and control the energy source with reference to the temperature signal to heat the fluid so as to maintain the fluid at the setpoint temperature at the downstream location.

14 Claims, 3 Drawing Sheets

(52) U.S. Cl.
CPC .......... *B23Q 11/143* (2013.01); *B23Q 11/146* (2013.01); *G05D 23/1393* (2013.01); *G05D 23/1931* (2013.01)

(56) References Cited

U.S. PATENT DOCUMENTS

| | | | |
|---|---|---|---|
| 6,448,537 B1* | 9/2002 | Nering | H01L 21/67109 |
| | | | 118/50.1 |
| 7,845,308 B1* | 12/2010 | Corneille | C23C 18/1632 |
| | | | 118/429 |
| 2002/0020179 A1 | 2/2002 | Winkler et al. | |
| 2002/0104646 A1 | 8/2002 | Jeong | |
| 2003/0079485 A1* | 5/2003 | Nakata | B23Q 11/141 |
| | | | 62/185 |
| 2006/0196957 A1 | 9/2006 | Johnson | |
| 2010/0193980 A1* | 8/2010 | Ghosh | B23D 79/00 |
| | | | 264/28 |

FOREIGN PATENT DOCUMENTS

| | | |
|---|---|---|
| WO | 2008078525 A1 | 7/2008 |
| WO | 2012110859 A1 | 8/2012 |

OTHER PUBLICATIONS

European Patent Office, International Search Report and Written Opinion of the International Searching Authority, International Application No. PCT/GB2016/050433, dated May 20, 2016 (12 pages).

\* cited by examiner

MACHINE TOOLS AND METHODS OF OPERATION THEREOF

CROSS-REFERENCE TO RELATED APPLICATION

This application is a submission under 35 U.S.C. § 371 of International Application No. PCT/GB2016/050433, filed Feb. 22, 2016, which claims priority to Great Britain Application No. 1503019.0, filed Feb. 24, 2015, the disclosures of which are hereby expressly incorporated by reference herein in their entireties.

FIELD OF THE INVENTION

The present invention relates to machine tools and more particularly to temperature control in such machines.

BACKGROUND OF THE INVENTION

A key requirement for the correct function of high precision machines is the temperature control of elements of the machine, and the temperature control of any fluids supplied to the machine. This is particularly true of, for example, roll turning machines and large optical grinding machines, where the dimensional stability of the machine structure must be maintained to fractions of a micrometer over extended periods of time.

Elements of the machine structure that typically must be temperature controlled include the machine base, linear guideways, workpiece spindles, tool spindles, metrology structures, and other parts which would influence the control of final workpiece dimensions. Different types of machine element present different challenges in the way their temperature, and thus dimensional stability, are controlled.

A machine base and the larger components of a machine are passive, and being generally the bulk of the machine structure must simply be held at a pre-determined temperature, typically 20° C. The acceptable limit to variations from that temperature can be as small as ±0.001° C. The entire machine will typically be placed in a temperature controlled environment. However this environment cannot be maintained to such a fine level of thermal stability without extraordinary effort and an accompanying uneconomic cost overhead.

A method that is known to give good results for maintaining the necessary stable structural control is executed by passing a temperature controlled fluid either over, or through the structure, where the fluid temperature is at the required temperature for the structure in question. This method has been referred to as a "Liquid Shower" or "Oil Shower" (where oil is the fluid). The liquid is caused to flow over the outer and sometimes inner surfaces of the structure. Other areas of the machine may have voids, or drillings, through which the temperature controlled fluid is also passed. This technology is described for example in a Society of Manufacturing Engineers paper entitled "An Order of Magnitude Improvement in Thermal Stability with Use of Liquid Shower on a General Purpose Measuring Machine"; J B Bryan et al, May 6, 1982.

As the temperature of the structure is overwhelmingly dominated by the temperature of the fluid, the fluid temperature must be maintained to the required temperature to the same level of accuracy as that of the machine structure, for example±0.001° C. in the aforementioned ultra-precision applications.

In other areas of a precision machine, particularly in fast moving elements such as wheel spindles, heat is generated by various means, due to inefficiencies of drive motors or from friction between two sliding surfaces for example. To remove the heat from these regions, and to prevent the heat entering the dimensionally critical regions of the machine (for example the base), a temperature controlled fluid is circulated through features such as drillings or cavities in the machine element in question, as close as is possible to the point of heat generation. Temperature control of this fluid with a high degree of accuracy is again desirable.

A further example of a fluid-related thermally critical machine function is where there is a requirement for the machine to be supplied with fluids related to the machine operating process, for example cutting fluids. These fluids are also required to be temperature controlled to high levels of accuracy as, again, they often come into contact with the machine elements previously described which define the machine's dimensional stability, for example the base. As these fluids are often switched on and off at various times to suit the machine operation, when the machine's accuracy requirement may be at its highest, the effect of varying fluid temperatures can be highly significant, again potentially requiring levels of control of ±0.001° C.

Another example of a fluid requiring a high level of temperature control relates specifically to machines which use hydrostatic bearings. In this case, the fluid that creates the stiff bearing films within spindles and linear slide systems often flows out of the bearings and over dimensionally critical machine elements, which would again be detrimental to the machine dimensional stability if the temperature of the fluid varied from that of the machine structure. In this particular case, the temperature of the fluid rises as it passes through the bearing, proportional to the pressure drop of the fluid, and as this pressure drop is known, and constant, the inlet temperature of the fluid can be lowered proportionally to exit at the machine ambient temperature.

Various methods have been employed to cause the fluid temperature to be changed. In some cases the machine working fluid is passed through a mechanism that directly heats or cools the fluid. In other cases a second controlling fluid at a higher or lower temperature to the machine fluid is passed through one side of a heat exchanger while the machine fluid passes through the other half, and by varying the flow rate of the controlling fluid the working fluid temperature is adjusted. In another method, a supply of machine fluid at a temperature higher than the required temperature is mixed with a supply of machine fluid at a lower temperature, the proportions being determined to achieve the required mixed temperature. This type of approach is described for example in US 2002/0020179 A1, WO 2008/078525 A1, and U.S. Pat. No. 1,873,769.

At higher accuracy levels, the required machine fluid temperature control is often not achieved by one system, but goes through a coarse temperature control device, followed by a single, or sometimes multi-step adjustment process, the final adjustment being made when the temperature variation is close to the required accuracy. In this way, the requirements for a system to have high heating or cooling power while simultaneously maintaining the highest levels of accuracy is avoided.

SUMMARY OF THE INVENTION

The present invention provides a fluid temperature control assembly in combination with a machine tool, wherein the assembly is arranged to adjust the temperature of a fluid being supplied to the machine tool to maintain the fluid at a setpoint temperature at a location downstream of the assembly, and the assembly comprises:

a fluid inlet for receiving a flow of the fluid at a temperature below the setpoint temperature;

a radio frequency (RF) or microwave energy source to supply energy to the fluid as it passes through the assembly to heat the fluid;

a fluid outlet for outputting the fluid;

a fluid conduit arrangement which is coupled to the fluid outlet to carry the fluid to the machine tool;

a temperature sensing arrangement for outputting a temperature signal responsive to the temperature of the fluid at the downstream location;

a control arrangement configured to receive the temperature signal and control the energy source with reference to the temperature signal to heat the fluid so as to maintain the fluid at the setpoint temperature at the downstream location.

Application of heat to the fluid by RF or microwave energy transfer is a direct application of the energy into the fluid itself which addresses drawbacks of existing approaches.

Detrimental effects caused by fluid boundary layers and thermal gradients are avoided as the controlled heating energy is applied directly into the fluid, and not just its outer surfaces. Secondly, there is no heating element or intermediate materials that must be heated first, that will otherwise increase the thermal inertia of the system.

Furthermore, the system does not rely on turbulence (another uncontrollable introduction of heat) to mix the fluid to ensure even temperature distribution.

The claimed assembly has a through-flow configuration, where electromagnetic energy, which may be from any point in the spectrum from radio frequencies (RF) to millimetric microwave frequencies, acts upon the fluid causing it to heat up in a controlled manner as it passes through the assembly.

In embodiments using an RF energy source, RF energy is preferably coupled to the fluid via an impedance matching arrangement. This may improve the efficiency with which the RF energy is transmitted to the fluid.

In preferred arrangements, the downstream location is at or adjacent to the fluid outlet of the fluid temperature control assembly.

The downstream location may be in the path of the fluid from the assembly to the machine tool.

Alternatively, or in addition, the temperature sensing arrangement may be responsive to the temperature of the fluid further downstream of the temperature control assembly, for example at a particular location on, within, close to or as it leaves the machine tool.

Methods that may be used to control the temperature of a fluid to high levels of accuracy in accordance with the present invention include the following approaches:

1. The fluid flows past a temperature measuring device, which determines what the temperature is, and heating is applied, proportional in some way to the required variation in temperature. The fluid temperature is precisely controlled and supplied to the machine tool at the desired temperature.

2. The fluid is passed through the machine tool, or machine elements, and the machine fluid outlet temperature is measured. The supply temperature is varied by heating to achieve the correct outlet temperature. The control in this case is capable of reacting to variations in the heat energy being supplied by the machine.

3. A third approach uses cascade control where the temperature of the fluid supplied to the machine and the temperature of the fluid leaving the machine are both measured. The measurements are used in combination to rapidly change the temperature of the fluid being delivered to the machine to compensate for the slower changing temperature of fluids leaving the machine.

The setpoint temperature may be constant, or may vary having regard to variations in the amount of heat energy being generated within the machine tool.

In preferred embodiments, the control arrangement is configured to receive an input signal responsive to an operating parameter of the machine tool, and to adjust the setpoint temperature with reference to the input signal.

The level of unwanted heating can at times be predicted, for example where it is proportional to an operating parameter such as the speed of a spindle for example, and in this case the setpoint temperature of the temperature controlling fluid can be varied to pre-empt the potentially problematic heat generation.

The present invention further provides a machine tool system including a fluid temperature control assembly in combination with a machine tool as described herein. In such a system, the fluid leaving the machine may be fed back to the fluid inlet of the assembly in a recirculating configuration.

In embodiments of such a system, a cooling arrangement may be provided which is configured to cool the fluid from the machine tool to a temperature below the setpoint temperature before it is fed back to the fluid inlet of the assembly.

In most applications, the machine being supplied by the fluid adds some heat energy. Therefore the fluid reservoir generally contains fluid at a higher temperature than is required. This heat can be removed by commercially available cooling systems but not to acceptable temperature accuracy levels. By setting this lower temperature close to and below the final required temperature, the claimed assembly is able to carry out the final small and precisely controlled temperature increase to bring the fluid to the required temperature. Minimizing the size of the increase helps system efficiency (that is, not having to reduce the fluid temperature only to raise it again) and also reduces the amount of energy to be supplied by the assembly, which helps reduce its size and thermal inertia and makes the required precise control easier to achieve.

The cooling arrangement may comprise a heat exchanger for example.

Preferably, the system includes a fluid pressurizing arrangement for increasing the pressure of the fluid which is delivered by the cooling arrangement before it is fed back to the fluid inlet of the assembly.

The present invention also provides a method of adjusting the temperature of a fluid being supplied to a machine tool to maintain the fluid at a setpoint temperature at a predetermined location, comprising the steps of:

receiving a flow of the fluid at a temperature below the setpoint temperature;

heating the fluid flow using radio frequency (RF) or microwave energy; and feeding the fluid flow to the machine tool, the fluid being heated in the heating step such that the setpoint temperature is maintained at the predetermined location.

BRIEF DESCRIPTION OF THE DRAWINGS

Embodiments of the invention will now be described by way of example and with reference to the accompanying schematic drawings, wherein.

DETAILED DESCRIPTION OF THE INVENTION

Figure 1:
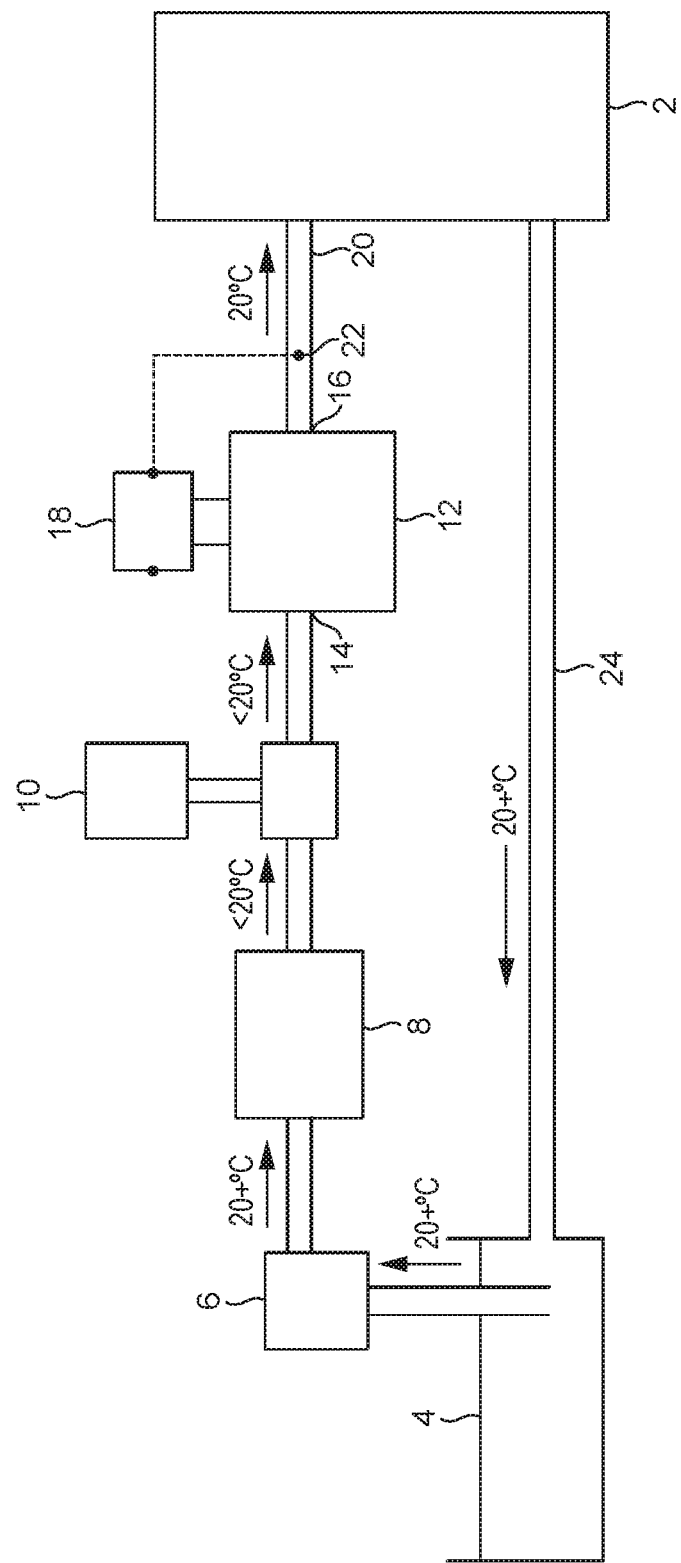
FIG. 1 is a block diagram of a machine tool system including a fluid temperature control assembly according to an embodiment of the invention.

A primary problem associated with controlling the temperature of a fluid to extreme accuracy is encountered in all systems where the temperature change is effected by passing the fluid over a surface, or through a void of an entity that is made to be a different temperature to the fluid, with the intention of passing heat in either direction between the fluid and the surface or entity. The combination of boundary layers in the fluid, and the poor thermal conductivities of some of the fluids used can cause difficulties in passing the energy into and out of the fluid, resulting in thermal gradients across the fluid.

Introduction of turbulence within the heat transfer device is a way of achieving mixing, to break down thermal gradients. However, this in itself will add heat to the system in an uncontrolled manner, and this extraction of heat energy from the fluid's kinetic energy will cause a pressure drop.

Another fundamental issue with creating a precise control loop around a temperature controlling device is response time for the heating or cooling device. Where there is, for example a heat exchanger transferring heat between the machine fluid and a control fluid (either way), the barrier between the two fluids will have a response time due the thermal inertia of the barrier—which is related to thickness of the barrier wall. Low pressure systems can afford thinner walls than high pressure systems, and therefore have faster response times, but introducing a pump to increase fluid pressure after the temperature control device introduces a new and variable source of temperature variation.

Heat exchanger based systems rely on the ability of the control system to alter the flow rate of the controlling fluid. The flow controlling device (valve) must be able to respond precisely to changing requirements to flow, with no delays, hysteresis or non-linearity. This is not a trivial task.

Other methods of changing the temperature of a fluid while passing through a temperature controlling device include, for example, electric heaters. The critical issue with these devices is, again, the thermal inertia of the device. In this case the thermal inertia can be present in the heating element itself plus any housing, covering, or other interface between the element and the fluid to be controlled.

Another important factor relating to the ability of a temperature control to perform to high levels of accuracy, is the volume of fluid within the system, and the velocity with which it passes through the system. A high volume and/or low velocity introduce a time delay between the points where the thermal inputs are being applied, and the result being identified at the output. The transport delay can be modelled as a pure phase shift which causes difficulties in maintaining good control.

Other difficulties are related to the temperature sensor which is required to measure the resultant fluid temperature. If the fluid has a temperature gradient through it due to uneven heating or cooling, it is impossible to determine the actual bulk temperature from any sensor in any fixed position, and without reliable feedback, temperature control thus becomes impractical. All of the above methods have the intrinsic potential for creating temperature gradients within the output flow.

To achieve a high accuracy of temperature control of a fluid, a system preferably has the following attributes:

1. The temperature change should be distributed evenly throughout the fluid volume, not just the outer surfaces of the fluid volume.
2. There should be no delay between the demands for heat to be transferred to or from the fluid, and the transfer being implemented (inertial effects). Similarly, there should be no delay between the demand for the heat transfer to stop and the cessation of the transfer (overshoot).
3. The required energy transfer rate must be high so the temperature change can be implemented rapidly.

FIG. 1 illustrates the main components of a machine tool system embodying the present invention. It shows a machine tool 2 together with an arrangement for supplying and recirculating a cooling fluid.

A supply of the fluid is held in a reservoir 4. Fluid is drawn from the reservoir by a low pressure pump 6. This pump feeds the fluid to a low accuracy cooling system 8. In this embodiment, the setpoint temperature for the fluid when supplied to the machine tool is 20° C. by way of example. The low accuracy cooling system cools the fluid until its temperature is a little below the setpoint temperature, that is just below 20° C. in this example.

In applications where the fluid needs to be supplied to the machine tool at a high pressure, a high pressure pump 10 is provided in the fluid path, after the low accuracy cooling system 8.

The high pressure fluid outputted by the pump 10 is then fed into the fluid temperature control assembly 12. This assembly includes a fluid inlet 14 and a fluid outlet 16. Within the assembly, there is a source of RF or microwave energy (not shown) governed by a control arrangement 18. A fluid conduit 20 carries the fluid from the outlet 16 of the assembly to the machine tool 2. A temperature sensor 22 is responsive to the temperature of the fluid flowing along conduit 20. The sensor outputs a temperature signal responsive to this temperature and this signal is coupled to the control arrangement 18.

Once the cooling fluid has passed over and/or through the machine tool 2, it is collected in the machine and then fed back to the fluid reservoir 4 along return conduit 24. Its temperature will have been raised as it absorbs heat from the machine tool and so it will be above the setpoint temperature (that is, above 20° C. in this embodiment).

In the embodiment of FIG. 1, the temperature sensor 22 is located at or adjacent to the outlet 16 the assembly 12 and the temperature of the fluid being delivered to the machine system is being directly monitored. In other examples, the input or output temperature of the machine tool or both of its input and output temperatures could be chosen for the temperature monitoring points.

A temperature measured in the fluid delivery system is compared to a setpoint temperature by the control arrangement 12 and any error is fed through signal conditioning into compensation networks which derive a control signal for the energy source in the assembly.

The fluid is retrieved from the machine tool 2 and collected in the reservoir 4 before being scavenged by the pump 6 and outputted at low pressure. The fluid temperature rises due to the heating effect of the pump 6. This heat energy and a larger amount of heat energy are removed from the fluid using the cooling system 8. The heat energy may be removed at this point using conventional heat exchangers which are subject to the limitations of pressure which in the final part of the system may be too great to contain over the large area necessary for efficient heat exchanging. The additional heat removal makes an allowance for the energy which is added to the fluid by the high pressure pump 10. High pressure may be needed to feed the bearing systems in the machine at their normal working pressure for example. This pressure could be typically 70 bar (or greater). The assembly 12 can be configured to withstand a high delivery pressure, by minimizing the internal area over which the heat transfer from the energy source into the fluid is being made. The fluid is fed through a tube which extends through a heating chamber within the assembly. The tube is transparent to the electromagnetic energy. The tube configuration within the device may be straight or coiled, in a manner best suited to the absorption of the energy within the heating chamber.

The effective volume of the system where the heat transfer takes place preferably has a small internal surface area to minimise the forces acting on the energy transfer system. The fluid to be controlled may travel through a tube having the same diameter as the input and output of the heat control assembly to avoid turbulence in the device.

For both noise interference and safety reasons, the heating chamber is preferably designed in a manner which prevents electromagnetic energy being radiated from the device. The point of entry and exit of the tube carrying fluid is also preferably designed to avoid any stray electromagnetic radiation.

The temperature of the fluid as it passes through the assembly is precisely and evenly adjusted by the electromagnetic energy which is present using an electric field strength that is sufficient to heat the fluid.

The temperature measurement sensor 22 monitors the outlet temperature, and passes this information to the control arrangement 18. The control arrangement will adjust the power in the output stage of the energy source, the output stage being connected via an impedance matching unit to the heating chamber through which the controlled fluid flows.

The wavelength of the electromagnetic radiation is preferably chosen so that the heating effect within the fluid is as efficient as possible. Some fluids are bipolar and their molecules are directly excited by the electromagnetic radiation. Other fluids are heated through dielectric loss, generally at much lower frequencies. The amount of energy which is transferred to a fluid is dependent on the nature of the fluid, the frequency and the electric field strength of the electromagnetic radiation. Lower frequency RF heating needs a greater field strength which can lead to dielectric breakdown. Such dielectric breakdown must be prevented from occurring to avoid degrading the fluid or damaging the heating chamber.

Figure 2:
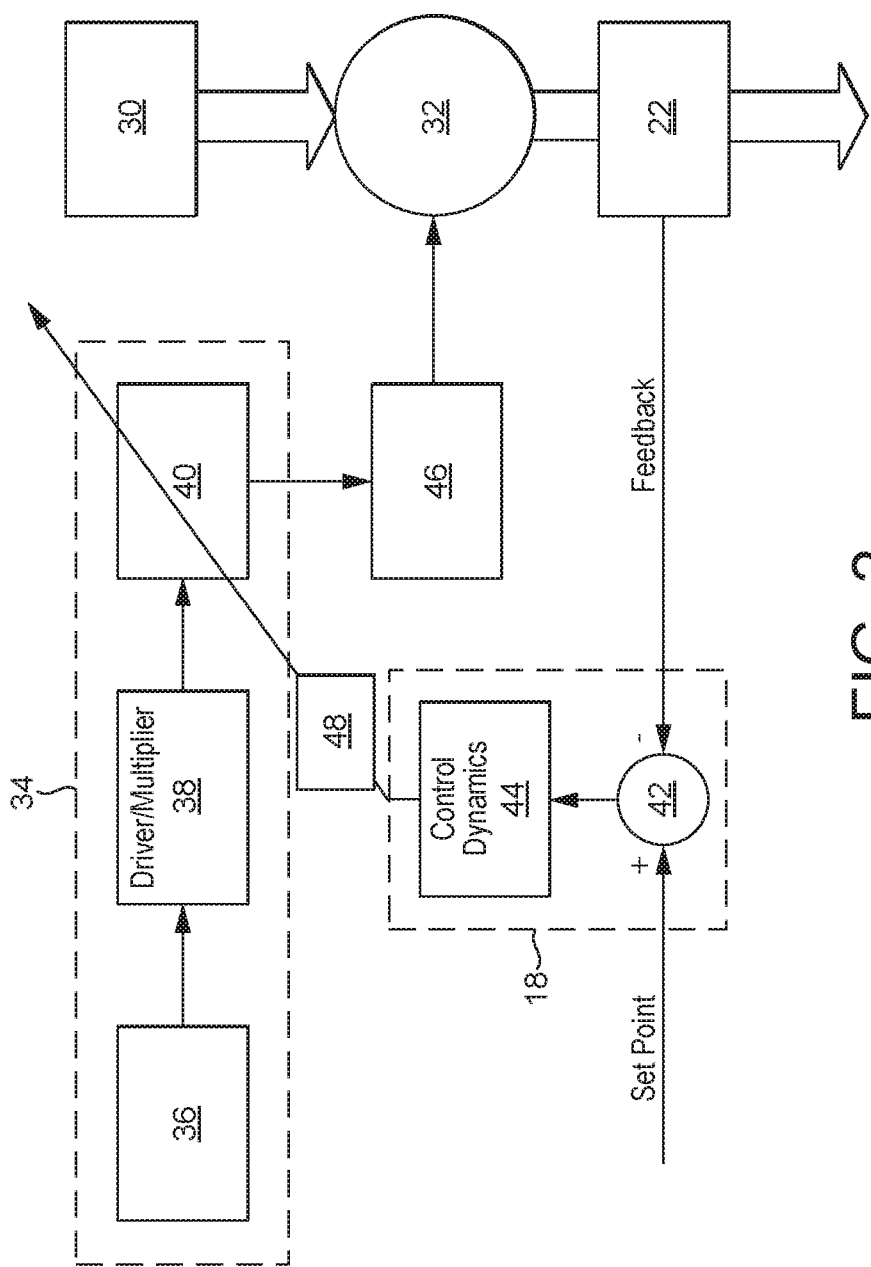
FIG. 2 is a block diagram of a fluid temperature control assembly embodying the invention and using RF energy.

FIG. 2 shows a block diagram of a fluid temperature control assembly according to an embodiment of the invention. In this embodiment, RF energy is used to heat the cooling fluid.

The fluid 30 passes through an electromagnetic heating chamber 32. An RF energy source 34 comprises an oscillator 36, a driver circuit 38 and a power amplifier 40. A control arrangement 18 comprises a signal comparison arrangement 42 and control circuitry 44. An impedance matching network 46 is coupled between the power stage 40 and the electromagnetic heating chamber 32.

The oscillator 36 produces a carrier wave at the fundamental frequency of excitation for the RF energy source. The driver circuit 38 increases the power and optionally selects any one of the harmonics available before being fed to the power stage 40. The RF energy is coupled to the heating chamber 32 through the impedance matching network 46 which ensures the RF energy is transmitted efficiently, minimizing standing wave reflections which would otherwise cause parasitic heating in the power amplifier stage 40.

The temperature of the fluid which has passed through the heating chamber 32 is monitored by the sensor 22. The sensor preferably has a fast reaction to changes in temperature. Thermistor or Pt1000 devices may be suitable, for example. The measured temperature is compared with the system setpoint by comparison arrangement 42 and any differences are fed through an electronic compensation network of control circuitry 44 to derive a gain control signal 48 which modifies the power in the output stage 40 of the RF energy source 34. The compensation network is chosen to control the speed of response and stability of the temperature control feedback loop.

Figure 3:
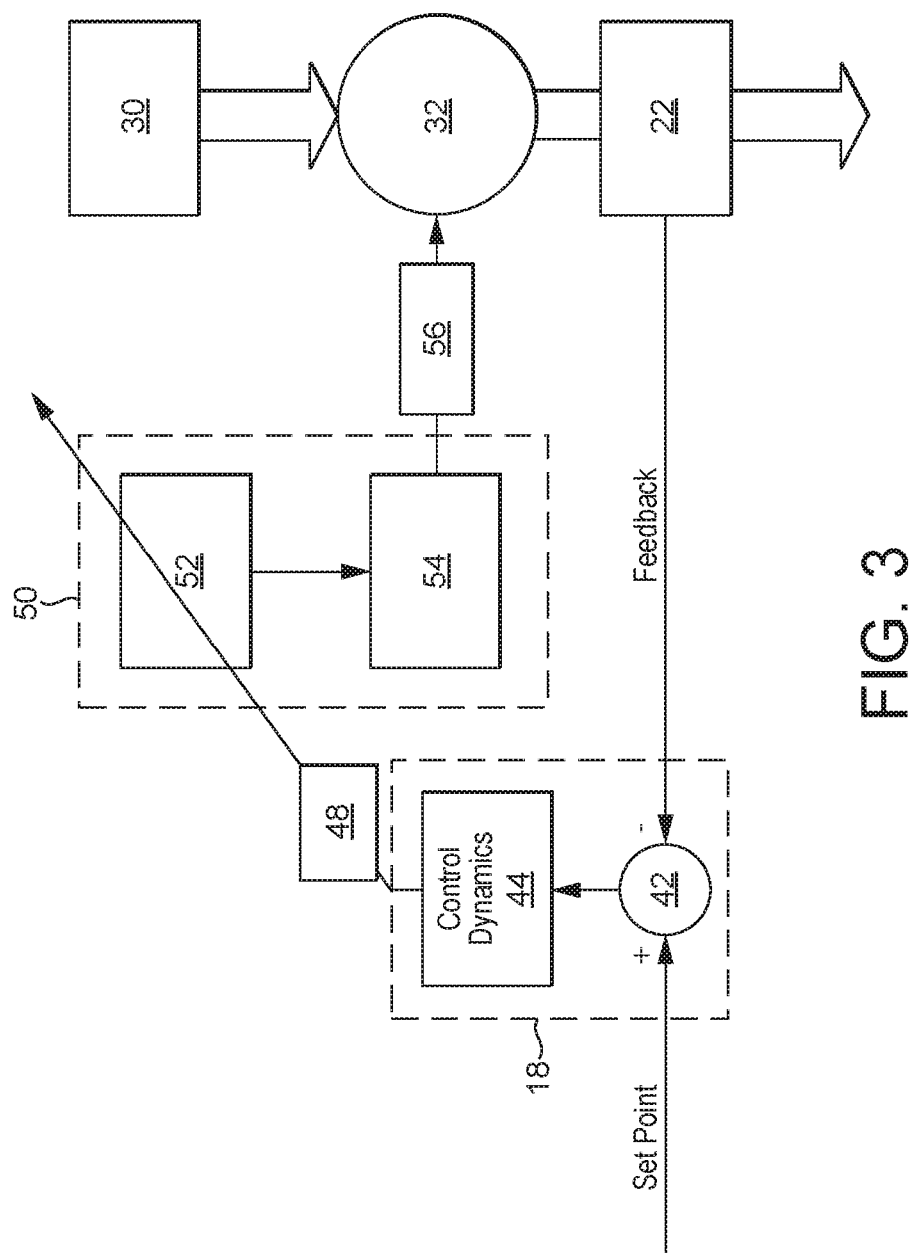
FIG. 3 is a block diagram of a fluid temperature control assembly according to a further embodiment of the invention which uses microwave energy.

FIG. 3 illustrates a further embodiment of a fluid temperature control assembly for use in an embodiment of the invention. In this embodiment, the cooling fluid is heated using microwave energy.

The microwave energy source 50 comprises an anode current or electromagnet coil driver 52 coupled to a magnetron 54. Microwaves are coupled from the magnetron 52 to the electromagnetic heating chamber 32 by a waveguide 56. The control arrangement 18 used to implement feedback control of gain signal 48 may be similar to that described in relation to the embodiment of FIG. 2.

The control assembly depicted in FIG. 3 is particularly suitable for use with fluids that respond to higher frequency RF energy. It may use a cavity magnetron 54 similar to the devices normally used in domestic microwave ovens.

The frequency of the microwave energy is fixed by the design of the microwave cavity within the magnetron 54, but the amount of power available can be varied through control of the average anode current by either pulse or peak control circuitry or by varying the magnetic field strength around the magnetron body.

It will be appreciated that where reference is made herein to a setpoint temperature, and maintaining a fluid at a setpoint temperature, this refers to a temperature within a tolerance range around a specific temperature. Depending on the accuracy required, the tolerance range may be ±0.01° C. or as small as ±0.001° C. for example.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

The invention claimed is:

1. A fluid temperature control assembly in combination with a machine tool, wherein the assembly is arranged to adjust the temperature of a fluid being supplied to the machine tool to maintain the fluid at a setpoint temperature at a location downstream of the assembly, and the assembly comprises:
   a fluid inlet for receiving a flow of the fluid at a temperature below the setpoint temperature;

a radio frequency (RF) or microwave energy source to supply energy to the fluid as it passes through the assembly to heat the fluid;

a fluid outlet for outputting the fluid;

a fluid conduit arrangement which is coupled to the fluid outlet to carry the fluid to the machine tool;

a temperature sensing arrangement for outputting a temperature signal responsive to the temperature of the fluid at the downstream location; and a controller configured to receive the temperature signal and control the energy source with reference to the temperature signal to heat the fluid so as to maintain the fluid at the setpoint temperature at the downstream location, wherein the controller is configured to receive an input signal providing an operating parameter of the machine tool, the operating parameter being a speed of a moving element of the machine tool, and to adjust the setpoint temperature with reference to the input signal.

2. The combination of claim 1, wherein RF energy is coupled to the fluid via an impedance matching network.

3. The combination of claim 1, wherein the downstream location is adjacent to the fluid outlet.

4. The combination of claim 1, wherein the downstream location is in the path of the fluid from the assembly to the machine tool.

5. The combination of claim 1, wherein the downstream location is in the path of the fluid leaving the machine tool.

6. The combination of claim 5, wherein the controller is configured to receive a further temperature signal which is responsive to the temperature of the fluid in the path of the fluid from the assembly to the machine tool, and to control the energy source also with reference to the further temperature signal.

7. A machine tool system including the combination of claim 1, wherein the fluid is fed from the machine tool back to the fluid inlet of the assembly.

8. The combination of claim 1, including a cooling arrangement configured to cool the fluid to a temperature below the setpoint temperature before it is fed to the fluid inlet of the assembly.

9. The combination of claim 8, wherein the cooling arrangement comprises a heat exchanger.

10. The combination of claim 8, including a fluid pressurizing arrangement for increasing the pressure of the fluid delivered by the cooling arrangement before it is fed to the fluid inlet of the assembly.

11. A method of adjusting the temperature of a fluid being supplied to a machine tool to maintain the fluid at a setpoint temperature at a predetermined location, comprising the steps of:

adjusting the setpoint temperature using a controller of the machine tool with reference to an input signal providing an operating parameter of the machine tool, the operating parameter being a speed of a moving element of the machine tool;

receiving a flow of the fluid at a temperature below the setpoint temperature;

heating the fluid flow using radio frequency (RF) or microwave energy; and feeding the fluid flow to the machine tool, the fluid being heated in the heating step such that the setpoint temperature is maintained at the predetermined location.

12. A machine tool system including a fluid temperature control assembly in combination with a machine tool, wherein the assembly is arranged to adjust the temperature of a fluid being supplied to the machine tool to maintain the fluid at a setpoint temperature at a location downstream of the assembly, and the assembly comprises:

a fluid inlet for receiving a flow of the fluid at a temperature below the setpoint temperature;

a radio frequency (RF) or microwave energy source to supply energy to the fluid as it passes through the assembly to heat the fluid;

a fluid outlet for outputting the fluid;

a fluid conduit arrangement which is coupled to the fluid outlet to carry the fluid to the machine tool;

a temperature sensing arrangement for outputting a temperature signal responsive to the temperature of the fluid at the downstream location;

a controller configured to receive the temperature signal and control the energy source with reference to the temperature signal to heat the fluid so as to maintain the fluid at the setpoint temperature at the downstream location, wherein the controller is configured to receive an input signal providing an operating parameter of the machine tool, the operating parameter being a speed of a moving element of the machine tool, and to adjust the setpoint temperature with reference to the input signal, and the fluid is fed from the machine tool back to the fluid inlet of the assembly; and a cooling arrangement configured to cool the fluid to a temperature below the setpoint temperature before it is fed to the fluid inlet of the assembly.

13. The system of claim 12, wherein the cooling arrangement comprises a heat exchanger.

14. The system of claim 12, including a fluid pressurizing arrangement for increasing the pressure of the fluid delivered by the cooling arrangement before it is fed to the fluid inlet of the assembly.

* * * * *